W. A. LOUDEN.
TROLLEY.
APPLICATION FILED APR. 5, 1920.

1,343,631.

Patented June 15, 1920.

INVENTOR
Walter A. Louden.
BY
William Louden,
ATTORNEY

UNITED STATES PATENT OFFICE.

WALTER A. LOUDEN, OF FAIRFIELD, IOWA, ASSIGNOR TO THE LOUDEN MACHINERY COMPANY, OF FAIRFIELD, IOWA, A CORPORATION OF IOWA.

TROLLEY.

1,343,631.  Specification of Letters Patent.  Patented June 15, 1920.

Application filed April 5, 1920. Serial No. 371,550.

*To all whom it may concern:*

Be it known that I, WALTER A. LOUDEN, a citizen of the United States, residing at Fairfield, in the county of Jefferson and State of Iowa, have invented a new and useful Improvement in Trolleys, of which the following is a specification.

My invention relates to that class of trolleys which are adapted to run on overhead tracks with a number of other trolleys, either before or behind each other, and it consists of attachments applied to the trolley frames in such a manner as to prevent the wheels of the trolleys from rubbing or jamming against each other, and to be readily removed therefrom when not required. Also, of other features herein described and more particularly defined in the claims.

Figure 1:
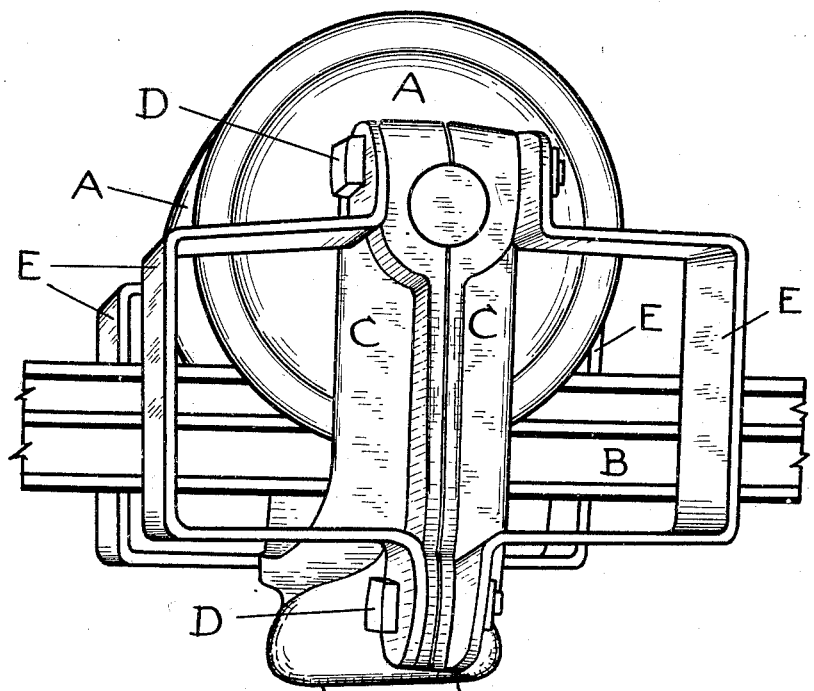
Figure 2:
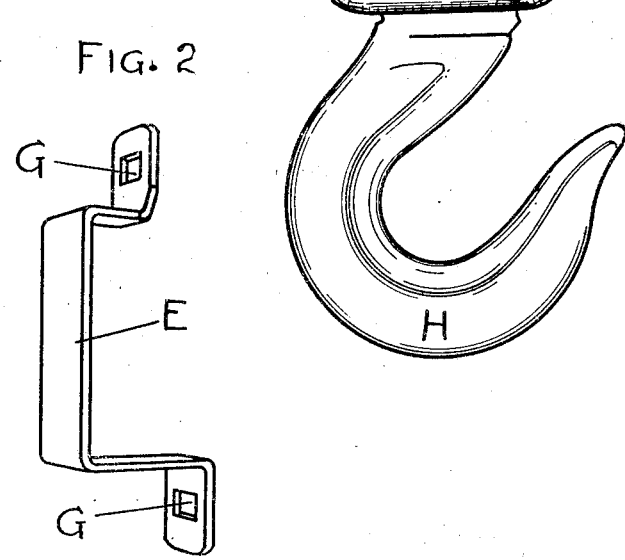

In the accompanying drawing forming a part of this specification, Figure 1 is a perspective of a trolley with attachments applied embodying my invention. Fig. 2 is a perspective of one of the attachments.

Referring to the drawing, A represents the wheels of the trolley designed to run on the track B. C represents the frame of the trolley which is preferably made in two parts, alike on both sides, and are held together by bolts D. E represents the attachments of which there are preferably four, two on each side, which may be connected to the frame of the trolley by the same bolts D, which hold the parts together.

The attachments E are preferably made of metallic straps having their central portions outwardly arched, their end portions bent inward and the extreme ends substantially in parallel lines with each other, as clearly shown in Fig. 2. The ends are fitted with apertures G which are spaced to correspond with the bolts D and when applied by these bolts to the trolley frame C, the central portions of the attachments E will extend beyond the periphery of the wheels A on both sides, and in each direction, which coming in contact with similar attachments on adjacent trolleys running on the same track, will prevent the wheels A from rubbing or jamming against each other.

The attachments E may be easily applied to trolleys having different forms of frames and on which no provision has been made to guard the wheels of adjacent trolleys from rubbing or jamming against each other and may be as easily removed therefrom when not required. H represents a hook to which the load to be carried by the trolley may be attached. The device is extremely simple and is thoroughly effective in operation.

What I claim is:

1. The combination of the trolley frame with transversely set bolts in its upper and lower ends and the attachments secured to the frame by the bolts as shown and described.

2. The combination of the trolley frame made in two parts and held together by bolts passing transversely through their upper and lower ends and the attachments secured to the frame by the bolts substantially as set forth.

3. The combination of the trolley frame carrying wheels adapted to run on an overhead track, and a plurality of attachments having their central portions extended beyond the periphery of the wheels and their ends detachably secured to the upper and lower ends of the trolley frame.

4. The combination of the trolley frame carrying wheels adapted to run on an overhead track, and a plurality of attachments having their central portions extended beyond the periphery of the wheels in opposite directions, and their ends detachably secured to the upper and lower ends of the trolley frame.

5. In overhead carriers, the combination with a trolley frame and wheels mounted in the frame, of two pairs of bumpers, each pair connected to a side of the frame outside of the wheels, and extended in opposite directions along the line of travel to points beyond the periphery of the wheels and laterally outside of the wheels.

Fairfield, Iowa, April 2, 1920.

WALTER A. LOUDEN.